US012062876B2

(12) United States Patent
Lorenschat

(10) Patent No.: US 12,062,876 B2
(45) Date of Patent: Aug. 13, 2024

(54) CONDUCTOR CONNECTION TERMINAL AND ELECTRICAL CONNECTOR

(71) Applicant: WAGO Verwaltungsgesellschaft mbH, Minden (DE)

(72) Inventor: Markus Lorenschat, Porta Westfalica (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 221 days.

(21) Appl. No.: 17/695,557

(22) Filed: Mar. 15, 2022

(65) Prior Publication Data

US 2022/0302607 A1 Sep. 22, 2022

(30) Foreign Application Priority Data

Mar. 17, 2021 (DE) ..................... 20 2021 101 354.0

(51) Int. Cl.

*H01R 4/48* (2006.01)
*H01R 13/629* (2006.01)
*H01R 35/04* (2006.01)

(52) U.S. Cl.

CPC ....... *H01R 4/48185* (2023.08); *H01R 13/629* (2013.01); *H01R 35/04* (2013.01)

(58) Field of Classification Search

CPC .. H01R 13/193; H01R 4/4818; H01R 4/4836; H01R 13/629; H01R 4/4815; H01R 35/04
USPC .................................................. 439/441, 266
See application file for complete search history.

(56) References Cited

U.S. PATENT DOCUMENTS 1,898,359 A 3/1930 Gilbert
4,303,294 A * 12/1981 Hamsher, Jr. .......... H01R 12/88 439/267
4,836,798 A * 6/1989 Carter .................. H01R 13/193 439/268
5,750,947 A * 5/1998 Rao ...................... H01H 1/5844 439/441
7,114,986 B1 * 10/2006 Toly ..................... H01R 4/4836 439/441
10,164,349 B2 12/2018 Koellmann
2003/0228785 A1 * 12/2003 Okita .................. H05K 7/1007 439/342
2005/0186820 A1 * 8/2005 Maeda ................... H01R 12/88 439/260
2016/0056551 A1 2/2016 Mostoller et al.

FOREIGN PATENT DOCUMENTS

| | | | |
|---|---|---|---|
| AT | 353876 | B | 12/1979 |
| DE | 102015119247 | A1 | 5/2017 |
| DE | 102016111461 | A1 | 12/2017 |
| DE | 102020116633 | A1 | 1/2021 |
| EP | 3128616 | A1 | 2/2017 |

* cited by examiner

*Primary Examiner* — Gary F Paumen
(74) *Attorney, Agent, or Firm* — Muncy, Geissler, Olds & Lowe, P.C.

(57) ABSTRACT

A conductor connection terminal having several spring force clamping connections, each of which has at least one clamping spring, which form a clamping point for clamping an electrical conductor with an associated busbar piece. The invention also relates to an electrical connector having at least one such conductor connection terminal.

19 Claims, 11 Drawing Sheets

CONDUCTOR CONNECTION TERMINAL AND ELECTRICAL CONNECTOR

This nonprovisional application claims priority under 35 U.S.C. § 119(a) to German Patent Application No. 20 2021 101 354.0, which was filed in Germany on Mar. 17, 2021, and which is herein incorporated by reference.

BACKGROUND OF THE INVENTION

Field of the Invention

The invention relates to a conductor connection terminal comprising a plurality of spring force clamping connections, each of which has at least one clamping spring, which form a clamping point for clamping an electrical conductor with an associated busbar section. The invention further relates to an electrical connector having at least one such conductor connection terminal.

Description of the Background Art

In such conductor connection terminals with spring force clamping connections, it is known to use a swivelling actuation lever for the actuation of the spring force clamping connections, i.e., for opening clamping points. Such a conductor connection terminal is known, e.g., from DE 10 2015 119 247 A1, which corresponds to US 2018/0254568, which is incorporated herein by reference. Such actuation of the spring force clamping connection with an actuation lever is based on a lever principle. The actuation lever usually has a lever arm on which it can be operated manually.

SUMMARY OF THE INVENTION

It is therefore an object of the present invention to provide a conductor connection terminal having improved actuating features for opening clamping points. In addition, a corresponding electrical connector shall be specified.

This object is achieved by a conductor connection terminal of the type mentioned above in that the conductor connection terminal comprises, as a manual actuator for opening clamping points, a rotary actuator rotatably mounted about an axis of rotation, which is set up to deflect several or all clamping springs in the event of a rotation by a first angle of rotation and thereby to open the associated clamping points. The conductor connection terminal according to the invention thus has a novel actuation principle in which advantageously several clamping points can be opened and closed again by the actuation of a manual actuator. This is realized by the fact that the actuator is designed as a rotary actuator, which is rotatable about an axis of rotation. In contrast to an actuation lever, the rotary actuator is therefore not designed as a swivelling component, but as a purely rotatable component. By means of such a rotary actuator, several clamping points can be opened by a single manual operation, advantageously simultaneously. A relatively large gripping area can be provided on the rotary actuator for manual operation, so that it can be used particularly advantageously with conductor connection terminals in small conductor cross-sections.

In this way, the conductor connection terminal may be designed without an actuation lever for the actuation of clamping points of the spring force clamping connections, at least insofar as the spring force clamping connections can be actuated by the rotary actuator. In this way, the conductor connection terminal can be designed relatively compact and small-scale, which has further advantages, especially for use on an electrical connector, e.g., on a circular connector.

The rotary actuator can be rotatably mounted on a first housing part of the conductor connection terminal. The rotary actuator can therefore be rotated relative to the first housing part about the axis of rotation. This allows for the rotary actuator to be reliably supported, with high mechanical stability.

The rotary actuator can be formed as a second housing part of the conductor connection terminal. This has the advantage that the conductor connection terminal can be realized with relatively few components. In addition, the rotary actuator is easily accessible for manual operation and can be designed with dimensions comparable to the first housing part. As the second housing part, the rotary actuator can take over further functions of a conductor connection terminal housing, such as, e.g., the protection of internal components of the conductor connection terminal and their insulation. Advantageously, the second housing part may be formed as a cover part of the conductor connection terminal housing, which covers an interior of the first housing part at least partially.

Also, some or all of the clamping springs to be actuated by the rotary actuator can be arranged in a ring about a center and/or a center axis of the conductor connection terminal. In this way, a rotary mechanism for the actuation of several clamping springs, which is easy to implement in terms of design, can be conveniently implemented by means of a rotary actuator. The clamping springs can be arranged, e.g., on a circular circumference, e.g., concentrically to the center or to the center axis of the conductor connection terminal.

The axis of rotation can run through the ring-shaped arrangement of the clamping springs. In this way, the rotary actuation mechanism for actuating the clamping springs can be designed to be constructively simple and thus particularly favorable. The axis of rotation can, for example, run through the center of the conductor connection terminal and/or coincide with the center axis, i.e., be identical to the center axis.

The axis of rotation can run at least approximately parallel and/or in alignment with the conductor insertion direction of some or all clamping springs to be actuated by the rotary actuator. This makes it possible to easily equip the conductor connection terminal with several electrical conductors. In addition, even with electrical conductors already connected to the spring force clamping connections, a simple manual actuation of the rotary actuator is still possible, which is not hindered by the connected electrical conductors. Alternatively, it is also possible that the conductor insertion direction is aligned at an angle to the axis of rotation, so that the conductor insertion direction is oriented in the direction of the clamping point to the axis of rotation. A plugged in electrical conductor would then approach the axis of rotation in the direction of the conductor connection terminal.

The rotary actuator for some or all clamping springs to be actuated by the rotary actuator can have one or more conductor openings for the passage of an electrical conductor to the respective clamping point. This also promotes a simple assembly of the conductor connection terminal with the electrical conductors as well as simple operability with connected electrical conductors. The conductor openings may be, for example, designed as a slotted hole, e.g., as a longitudinal hole curved over a circular segment.

The clamping springs actuated by the rotary actuator in a rotation about the first angle of rotation exert forces on the rotary actuator which are in a force equilibrium. As a result, the rotary actuator and its bearing are evenly loaded. The wear and tear that occurs during rotary actuation is minimized. In order to achieve the force equilibrium, the clamping springs can, e.g., be arranged evenly distributed about the axis of rotation. With an even number of clamping springs, e.g., two clamping springs can always be arranged opposite each other to the axis of rotation. This is particularly useful if identical clamping springs or clamping springs with identical spring characteristics are used. It is also possible to use springs with different spring characteristics and then arrange them about the axis of rotation in such a way that the force equilibrium can still be achieved.

The rotary actuator can have several deflection elements by which the respective clamping springs are deflected in a rotation by the first angle of rotation. In this way, with an easy-to-implement mechanism, corresponding actuation forces can be distributed from one rotary actuator to the several clamping springs. The deflection elements can, for example, be designed as cams. The deflection elements may be shaped in such a way that they have a variable distance to the axis of rotation of the rotary actuator in the direction of rotation, i.e., over the angle of rotation. The deflection elements can be mounted as separate components in corresponding recesses of the rotary actuator.

At least one deflection element can be flexibly coupled with the rotary actuator. For example, a deflection element may be coupled with the rotary actuator via a flexible material connection. In particular, it is possible to mold the rotary actuator in one piece with one, several or all deflection elements, e.g., as a plastic injection molded component. This has the advantage that due to the coupling with the rotary actuator, the deflection elements are always in a defined position. This also simplifies the assembly of the components of the conductor connection terminal. The deflection elements cannot be individually lost.

The first housing part can have a deflection contour for the deflection of at least one deflection element. Due to the deflection contour, the respective deflection element can, for example, be pushed or pulled by the rotary actuator in the direction of the clamping leg of the clamping spring in order to deflect the clamping leg in this way.

The rotary actuator may be infinitely rotatable about the axis of rotation, in particular in only one direction of rotation, or has an end stop to limit the rotational movement. If the rotary actuator can be rotated endlessly, a risk of damage to the conductor connection terminal is avoided by improper overturning of the rotary actuator. However, it is then more difficult for the user to distinguish between the open and closed position of the clamping points if only using haptic sensing. If an end stop is available, then it is easier for the user to distinguish between the closed and the open position purely haptically.

The rotary actuator on the outer circumference can have a grip surface on which the rotary actuator is to be actuated manually, wherein the grip surface extends over the entire outer circumference or one or more sections of the outer circumference. This has the advantage that even with a relatively small conductor connection terminal, a relatively large grip surface can be provided for the manual actuation of the rotary actuator. The grip surface can be smooth or structured on the outer circumference. For example, a corrugation, several grooves, or a wavy contour may be provided on the outer circumference. This facilitates the transmission of force during manual actuation of the rotary actuator.

The rotary actuator can be set up to deflect one or more clamping springs in a rotation by a second angle of rotation greater than the first angle of rotation and thereby to open the associated clamping points which are not deflected during a rotation by the first angle of rotation. This has the advantage that the existing clamping springs of the conductor connection terminal can be actuated one after the other, so to speak, in stages, whereby the maximum actuating forces can be reduced. If, for example, the conductor connection terminal has six clamping springs, then in the case of a rotation by a first angle of rotation, e.g., by 30°, an arrangement of two clamping springs can be actuated, in the case of a further rotation by a second angle of rotation, e.g., by a further 30°, two further clamping springs can be actuated, and in a further rotation by a third angle of rotation, e.g., by another 30°, the last three clamping springs can be actuated. If the clamping springs, which are actuated at a certain angle of rotation, are evenly distributed about the axis of rotation, e.g., on opposite sides of the axis of rotation, then the aforementioned force equilibrium can also be achieved.

In order to return the clamping springs that have been deflected at a certain angle of rotation back to the starting position, and accordingly to close the associated clamping points, it is possible, depending on the design of the actuation mechanism, that the rotary actuator is turned back by the same angular dimension as the first angle of rotation, i.e., is rotated in the opposite direction. It is also possible that the rotary actuator can be rotated further in the same direction of rotation by another larger angle of rotation than the first angle of rotation to close the clamping points. In the case of a rotary actuator that can be rotated endlessly in one direction of rotation, both types of closing of the clamping points may also be provided, i.e., the user can optionally rotate the rotary actuator in the same direction of rotation or in the opposite direction of rotation, such as with the rotation by the first angle of rotation.

The conductor connection terminal on a conductor insertion side can have conductor insertion openings through which electrical conductors can be guided to the clamping points, wherein the conductor connection terminal has plug-in openings on a side facing away from the conductor insertion side which lead to electrical plug contacts arranged in the housing of the conductor connection terminal. In this way, the conductor connection terminal can be advantageously further developed into a connector.

With a rotation of the rotary actuator by the first angle of rotation, the total length of the conductor connection terminal may not change. Accordingly, the total length of the conductor connection terminal remains at least essentially constant regardless of the rotation of the rotary actuator. This ensures easy operation and actuation of the conductor connection terminal. In addition, space problems cannot be caused by rotating the rotary actuator in cramped design conditions. The total length of the conductor connection terminal is its dimension in the axial direction of the axis of rotation of the rotary actuator.

With a rotation of the rotary actuator by the first angle of rotation, the rotary actuator may not change its axial position relative to the first housing part. Thus, even in the event of a rotation, the rotary actuator remains at least essentially at the same axial position relative to the first housing part. This makes the operation of the rotary actuator pleasant to the touch, as compared to a mobile rotary actuator. In this case, the axial position is deemed to be the position in the axial direction of the axis of rotation of the rotary actuator.

The rotary actuator can be set up to deflect several or all clamping springs in a rotation by a first angle of rotation of less than 360 degrees, in particular less than 180 degrees, and thereby to open the associated clamping points. Thus, even a relatively moderate rotation of the rotary control element is sufficient for the complete actuation of the clamping springs. In particular, several full revolutions are not required, as is the case with thread mechanisms. This also simplifies the actuation of the conductor connection terminal.

The object mentioned above is therefore also achieved by an electrical connector, in particular a circular connector having at least one conductor connection terminal of the previously described type. This also allows for the advantages explained above to be realized.

For the purposes of the present invention, the undefined term "a" is not to be understood as a number word. If, for example, a component is mentioned, this is to be interpreted in the sense of "at least one component". As far as angles are given in degrees, these refer to a circle dimension of 360 degrees (360°).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
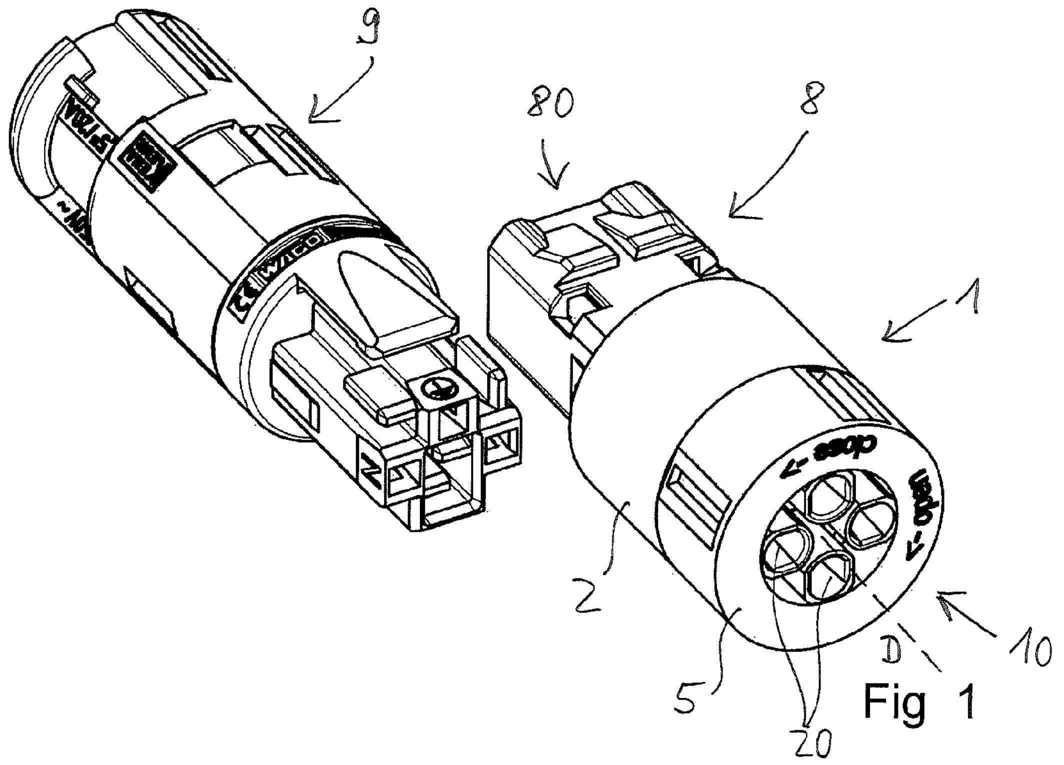
FIG. 1 is a perspective view of an electrical connector with a counter connector.
Figure 2:
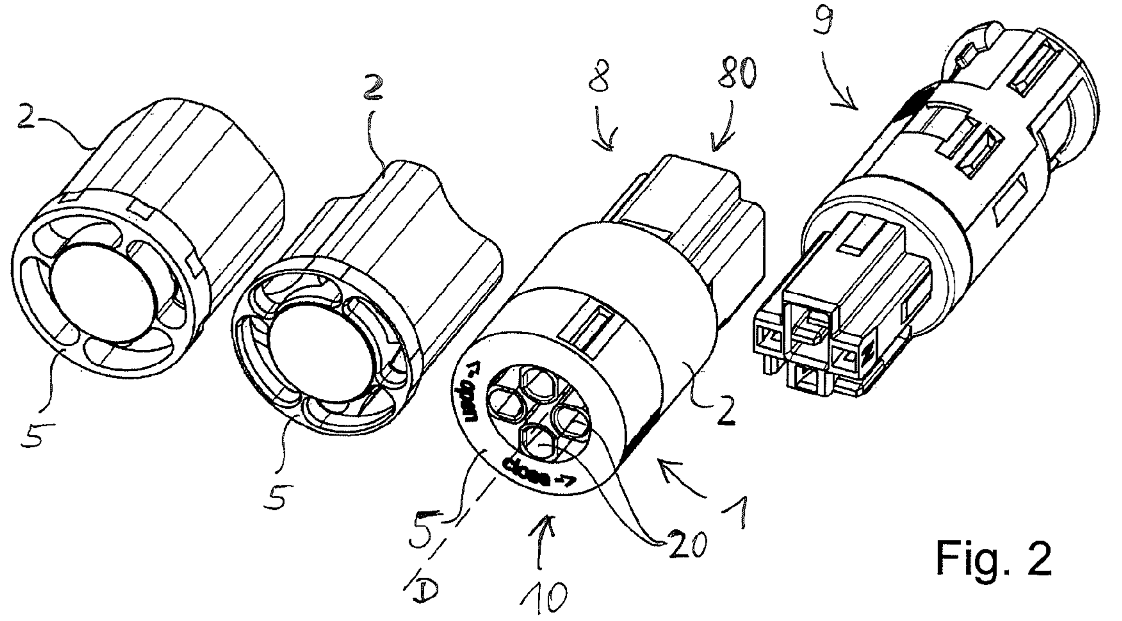
FIG. 2 shows the connector with the counter connector as well as alternative rotary actuators in a perspective view.

In different views, FIGS. 1 and 2 show an electrical connector 8 and a counter connector 9 associated with the connector 8 as a counterpart. The connector 8 has a conductor connection terminal 1. The conductor connection terminal 1 has a first housing part 2 and a rotary actuator 5, which at the same time forms a second housing part of the conductor connection terminal 1. The rotary actuator 5 is mounted so as to rotate about a rotary axis D and accordingly rotatable about the rotation axis D with respect to the first housing part 2.

Inside the conductor connection terminal 1 there are spring force clamping connections whose clamping points can be opened or closed again by rotating the rotary actuator 5 by the rotary axis D with respect to the first housing part 2. The conductor connection terminal 1 has a conductor insertion side 10, on which there are conductor insertion openings 20, through which electrical conductors can be led to the clamping points. On the side 80 facing away from the conductor insertion side 10, there are plug openings of the connector 8 that lead to electrical plug contacts arranged in the housing of the connector 8. In the embodiments shown, the connector 8 and accordingly also the conductor connection terminal 1 is designed four-pole, i.e., the connector 8 has four plug contacts. A spring force clamping connection is associated with each of the plug contacts.

Figure 3:
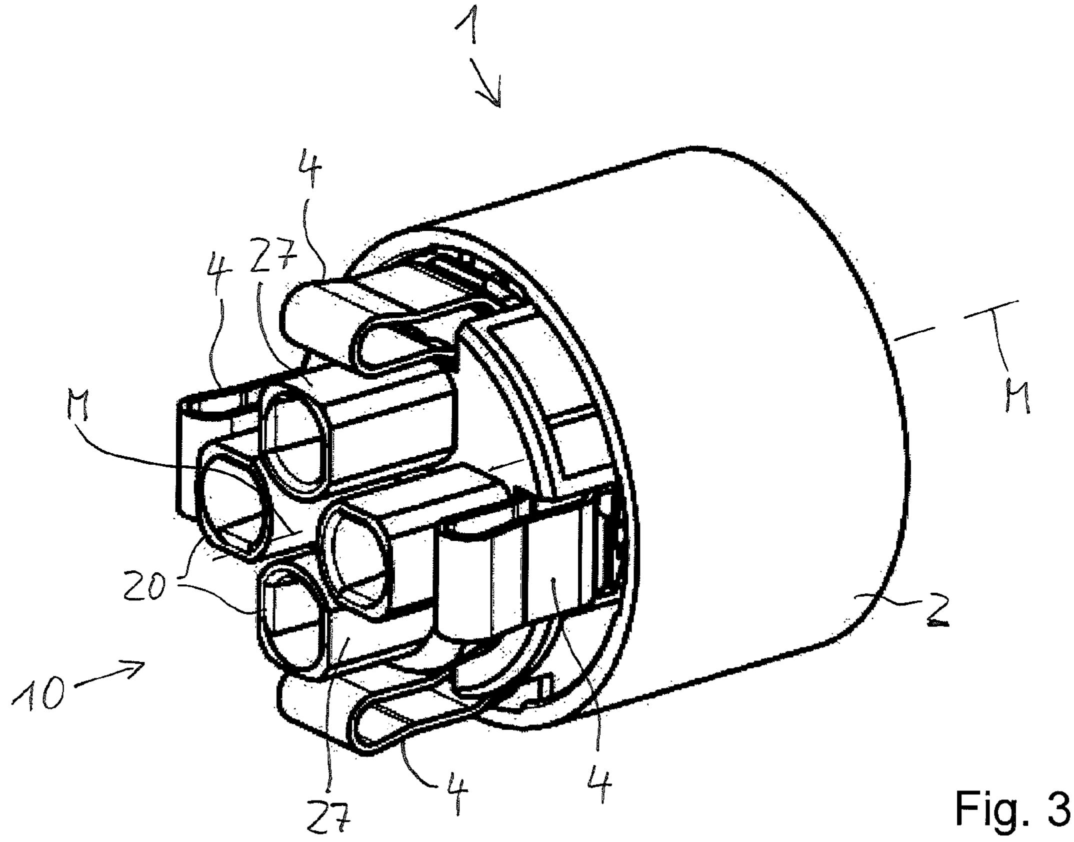
FIG. 3 shows parts of a conductor connection terminal according to FIG. 1 in a perspective view.

FIG. 3 shows the conductor connection terminal 1 with the rotary actuator 5 removed. It can be seen that the conductor connection terminal 1 has several clamping springs 4, which are evenly distributed over a circular circumference about a center axis M of the conductor connection terminal 1. The center axis M is identical to the axis of rotation D of the rotary actuator 5. The conductor insertion openings 20 or subsequent conductor insertion channels 27 are arranged between the clamping springs 4.

Figure 4:
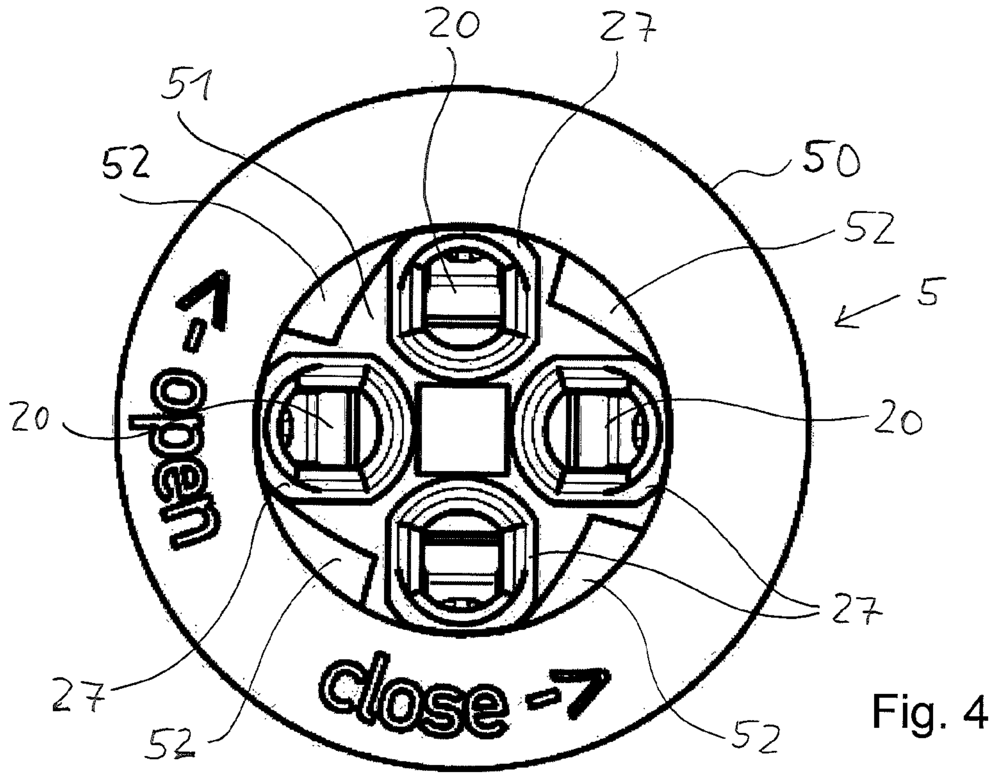
FIG. 4 shows a conductor connection terminal in top view on the conductor insertion side.

FIG. 4 shows the conductor connection terminal 1 according to FIG. 3 with the attached rotary actuator 5 in a view to the conductor insertion side 10. Due to the rotary actuator 5, the clamping springs 4 are now essentially covered and accordingly insulated from the environment. FIG. 4 partially shows several deflection elements 52. Due to the deflection elements 52, the respective clamping springs 4 are deflected by a first angle of rotation, e.g., by 60°, when the rotary actuator 5 is rotated with respect to the first housing part 2. On the rotary actuator 5 there is a label to illustrate the necessary actuation movement, by which the direction of rotation for opening (open) and closing (close) of the clamping points is indicated.

Figure 5:
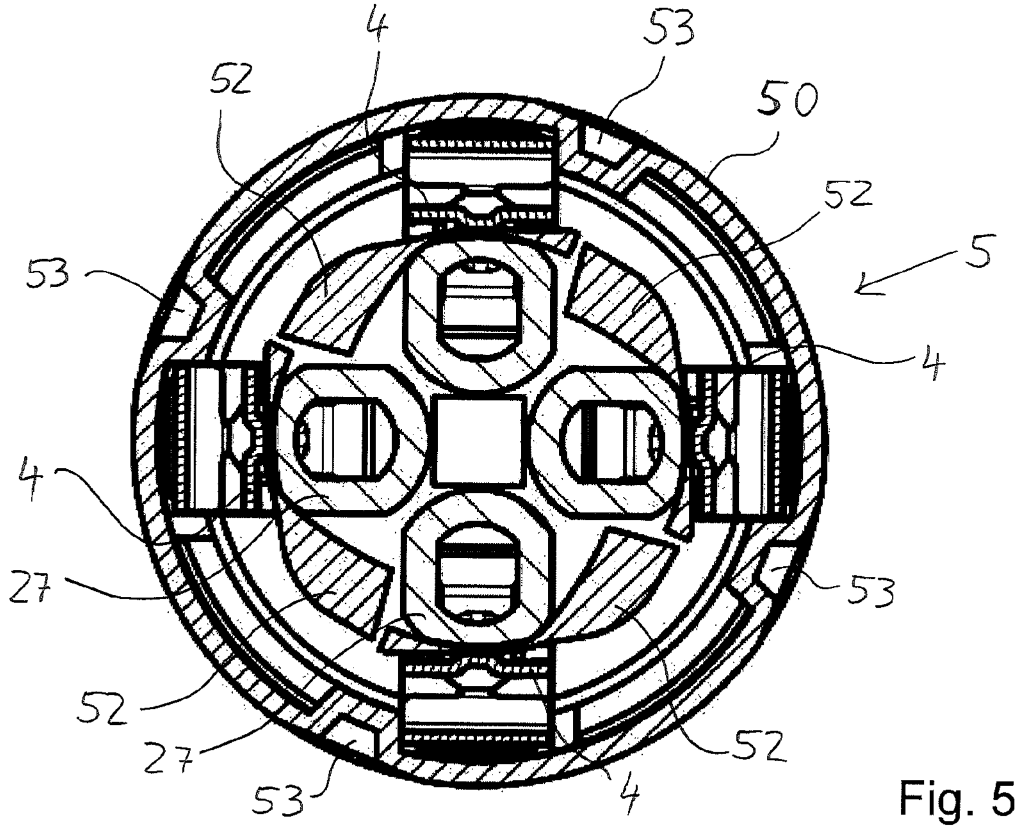
FIG. 5 shows a sectional view through the conductor connection terminal according to FIG. 4.

FIG. 5 shows the conductor connection terminal 1 from FIGS. 3 and 4 in a sectional view with a cutting plane perpendicular to the axis of rotation D. The cutting plane is chosen to pass through the deflection elements 52. It can be seen that the respective clamping spring 4 is not yet deflected in this actuation state, i.e., the respective clamping points are closed. The deflection elements 52 are accordingly in an angular position in which they exert no or at least no significant force on the respective clamping springs 4.

It can also be seen that the rotary actuator 5 on the outer circumference has a grip surface 50, on which the rotary actuator is to be actuated manually. The grip surface is structured with grip enhancing members 53, e.g., with recesses, for example with grooves running longitudinally.

Figure 6:
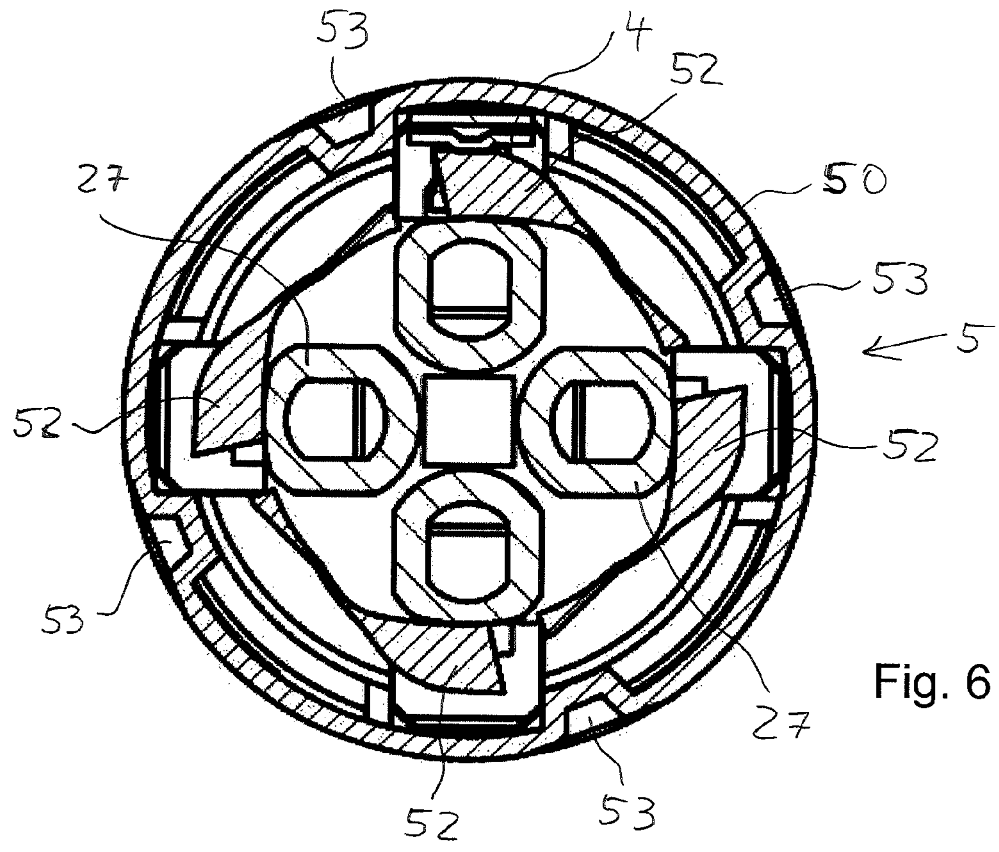
FIG. 6 shows the conductor connection terminal according to FIG. 5 in a different actuation state.

FIG. 6 shows the conductor connection terminal 1 in the same cutting plane as FIG. 5, wherein in FIG. 6 the rotary actuator 5 was now rotated clockwise by the first angle of rotation. Accordingly, the grip enhancing members 53 are now located at different angle positions. The deflection elements 52 are now moved into an area between the respective conductor insertion channel 27 and the clamping spring 4. Each deflection element 52 now exerts a compressive force on the clamping spring 4. The deflection element 52 is supported by the conductor insertion channel 27. The deflection element 52 is elastically deflected radially outwards in the rotated representation according to FIG. 6 as compared to the non-rotated position according to FIG. 5. According to FIG. 6, for example, the section of the rotary actuator 5 protruding inwards in the area of the grip enhancing members 53 rests laterally against the clamping spring 4 and thus acts as a stop or limitation of the rotational movement of the rotary actuator 5. The limitation of the rotational movement of the rotary actuator 5 can be done in both directions of rotation.

Figure 7:
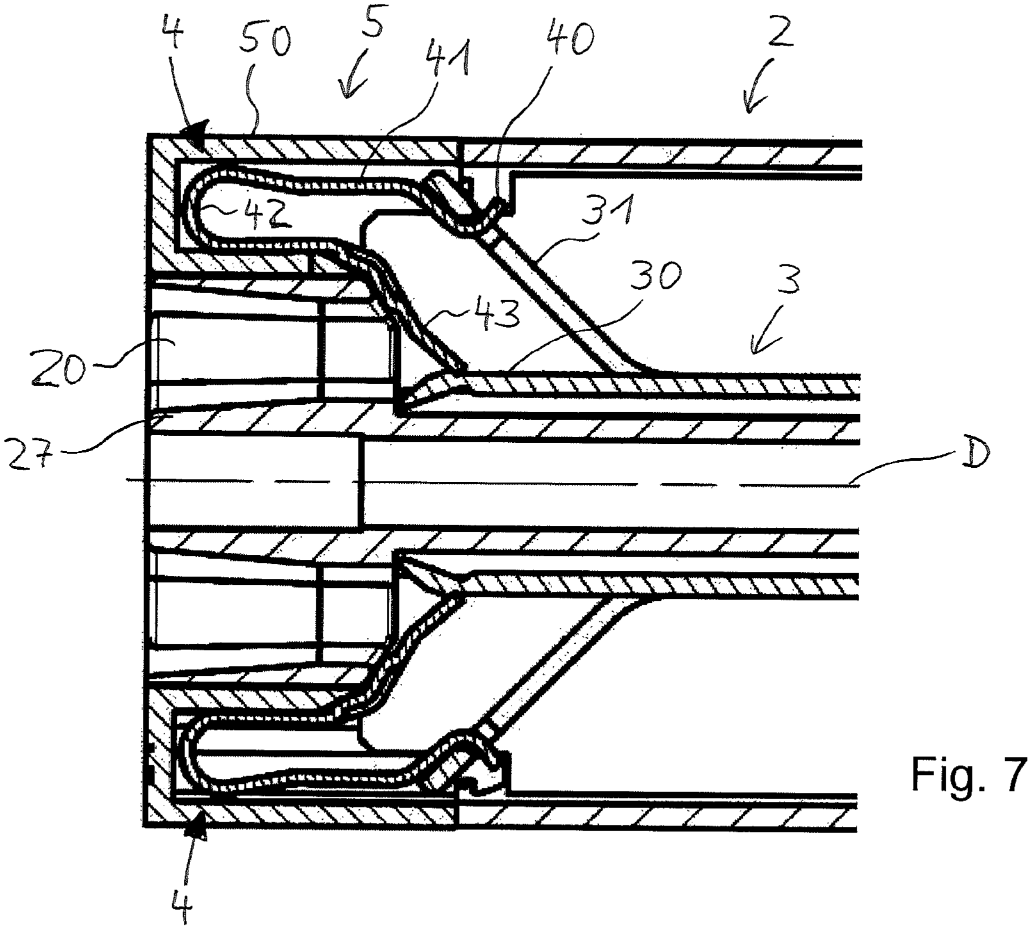
FIG. 7 shows the conductor connection terminal according to FIG. 4 in a longitudinal section.
Figure 8:
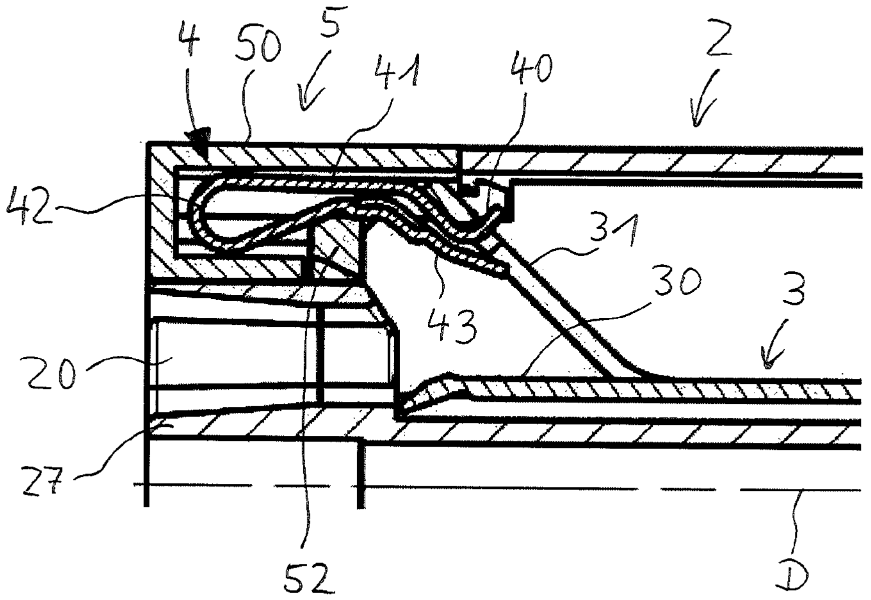
FIG. 8 is a partial representation of the conductor connection terminal according to FIG. 7 in a different actuation state.

FIG. 7 illustrates the state according to FIG. 5 in the longitudinal section, FIG. 8 the state according to FIG. 6 in the longitudinal section. It can be seen that the clamping spring 4 in each case has a contact leg 41, a spring bow 42 adjacent to the contact leg 41 and a clamping leg 43 adjacent to the spring bow 42. In the state shown in FIG. 7, the clamping leg 43 rests on a busbar piece 3 of the conductor connection terminal 1 associated with the clamping spring 4. A conductor clamping area 30 of the busbar piece 3 together with the free end of the clamping leg 43 forms a respective clamping point for clamping an electrical conductor. The contact leg 41 is used to fix the clamping spring 4 in the conductor connection terminal 1 and to absorb the force transmitted by the clamping leg 43. For this purpose, the contact leg 41, e.g., can be connected via an end-side fixing element 40 to a fastening element, e.g., to an area of the first housing part 2 or, as shown here, to a retaining arm 31 connected to the busbar piece 3.

In FIG. 7, the clamping point is closed. In FIG. 8, the clamping point is open. It can be seen that the deflection element 52 is now located between the conductor insertion channel 27 and the clamping leg 43. As a result, the clamping leg 43 is deflected upwards, i.e., moved away from the conductor clamping area 30 of the busbar piece 3. In this state, an electrical conductor can be placed at the clamping point without force or an already clamped electrical conductor can be removed again.

Figure 9:
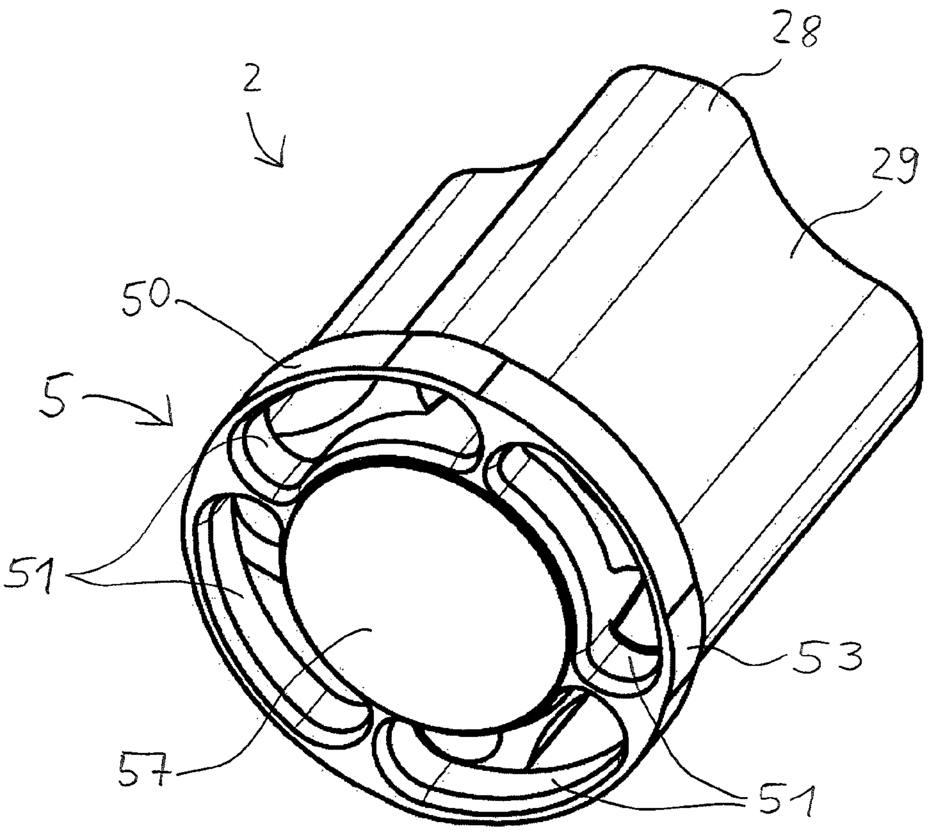
FIG. 9 shows a housing part with another rotary actuator in a perspective view.
Figure 10:
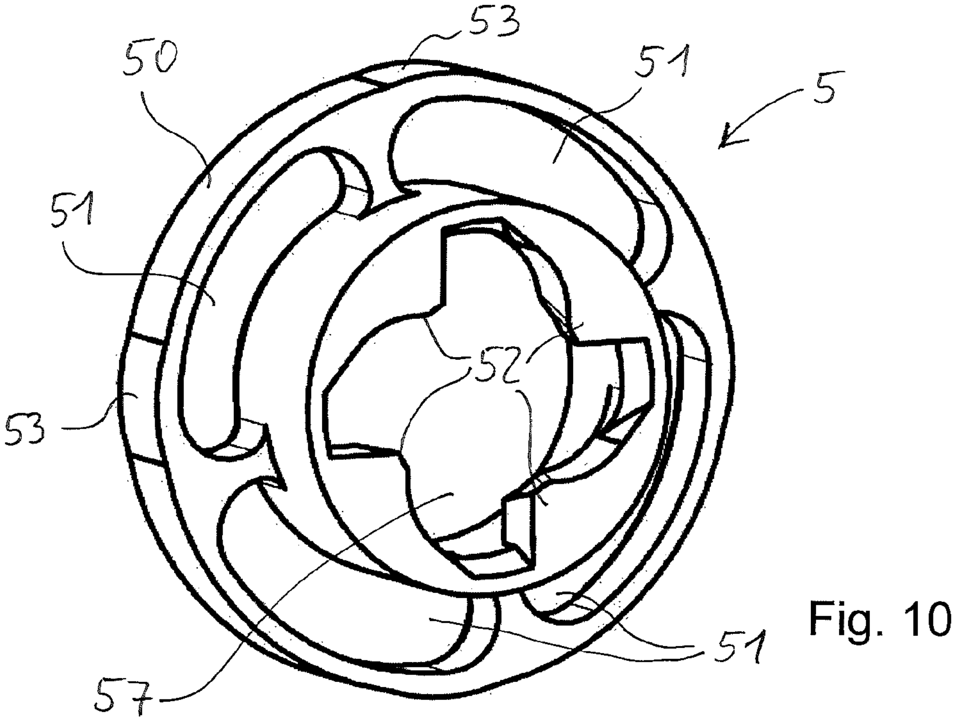
FIG. 10 is the rotary actuator according to FIG. 9 in a perspective view.

FIGS. 9 and 10 show details of a rotary actuator 5 in an alternative design. FIG. 9 also shows the first housing part 2. The first housing part 2 is in this case not designed with a circular outer contour, as in the embodiments described so far, but instead has a wave-like outer contour. In areas with a larger cross-sectional area of the housing part 2, in each case a receiving chamber 28 for the clamping spring is formed, in recessed areas 29 a recessed grip is formed, through which the first housing part 2 can be better held during the rotational movement of the rotary actuator 5.

In this case, the rotary actuator 5 has conductor openings 51 through which the electrical conductors can be guided through the rotary actuator 5 to the respective clamping point in the first housing part 2. The conductor openings 51 are designed as curved slotted holes, by means of which it is possible that the rotary actuator 5 can still be rotated in the desired manner even with electrical conductors inserted through the conductor openings 51. A middle area of the rotary actuator 5 is covered by a cover cap 57.

As FIG. 10 illustrates, there are deflection elements 52 in the space behind the cover cap 57, which deflect the respective clamping springs 4 when the rotary actuator 5 is rotated by the first angle of rotation. The deflection elements 52 are designed in the form of cams, which are formed in one piece with a basic body of the rotary actuator 5.

On the outer circumference of the rotary actuator 5 in turn is the grip surface 50. In this case, this has grip enhancing members 53 in the form of thickenings, by means of which the manually applied rotary actuation force can be better transmitted.

Figure 11:
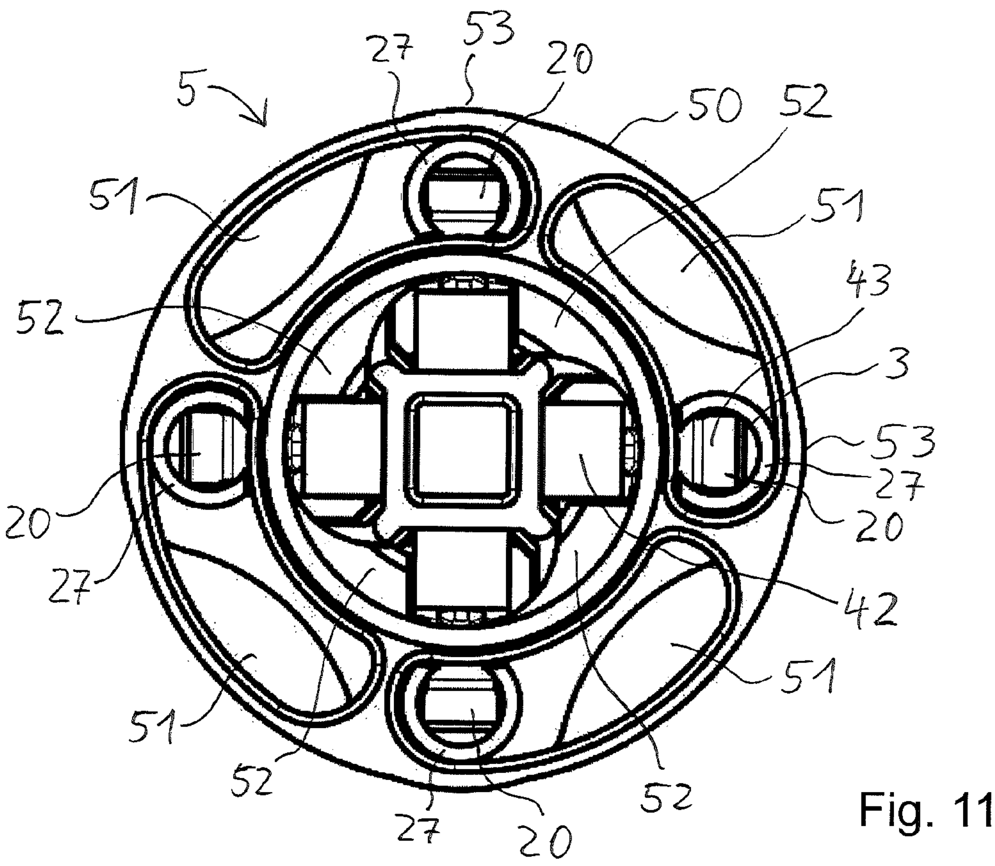
FIG. 11 shows a conductor connection terminal in a top view on the conductor insertion side according to FIG. 9.
Figure 12:
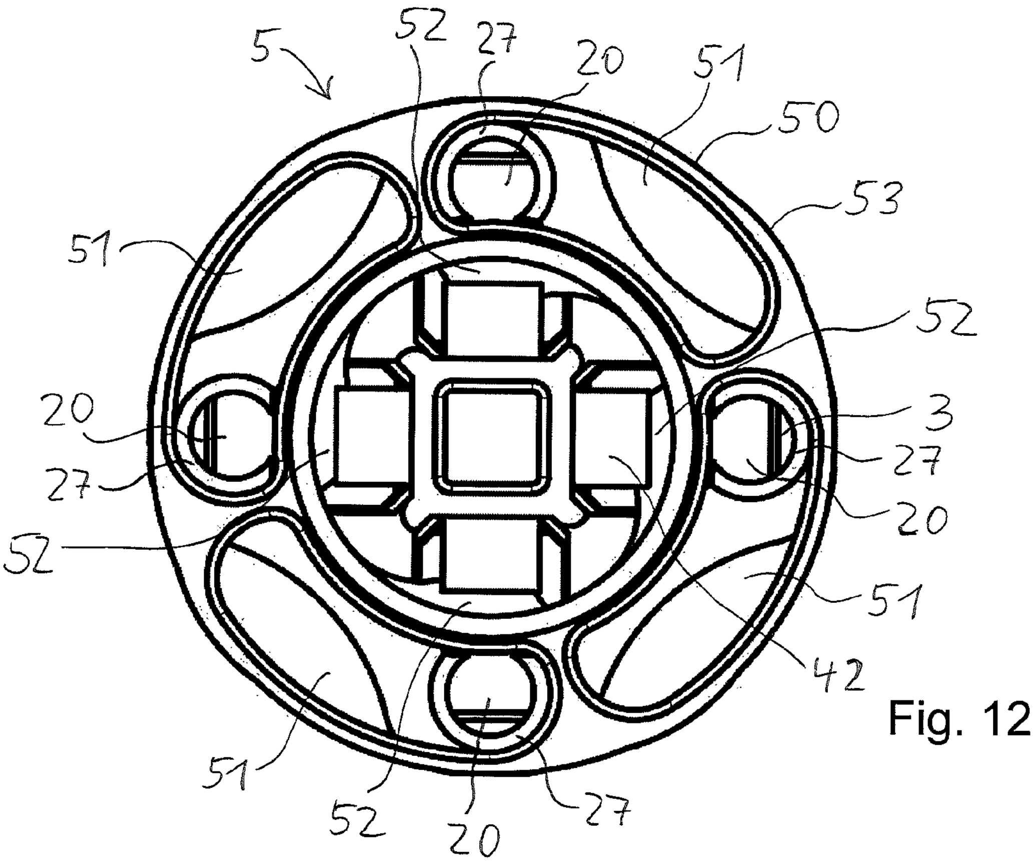
FIG. 12 shows the conductor connection terminal in the same view as FIG. 11, in a different actuation state.

FIG. 11 shows a conductor connection terminal 1 with a rotary actuator 5, as described above on FIGS. 9 and 10. Only the cover cap 57 is not shown. It can be seen that in the area of the respective conductor openings 51, the conductor insertion openings 20 are located. In FIG. 11, the clamping points are closed, i.e., the clamping springs 4 are not actuated by the deflection elements 52. In FIG. 12, the rotary actuator 5 is rotated by the first angle of rotation, so that the clamping springs 4 are deflected by the deflection elements 52 and the clamping points are open.

Figure 13:
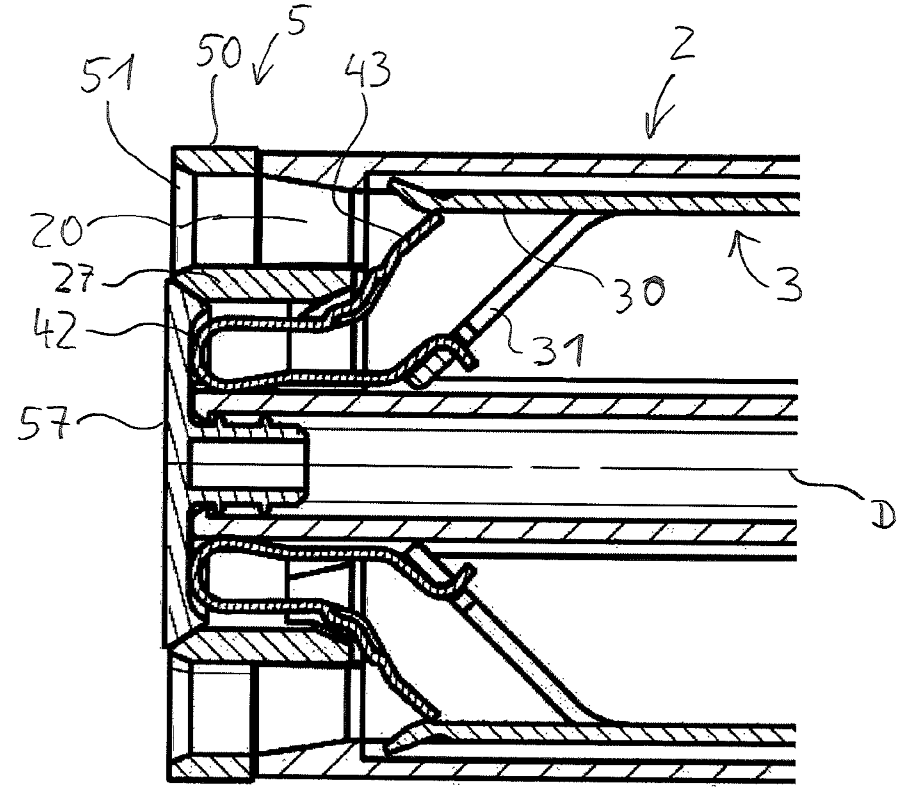
FIG. 13 shows the conductor connection terminal according to FIG. 11 in a longitudinal section.
Figure 14:
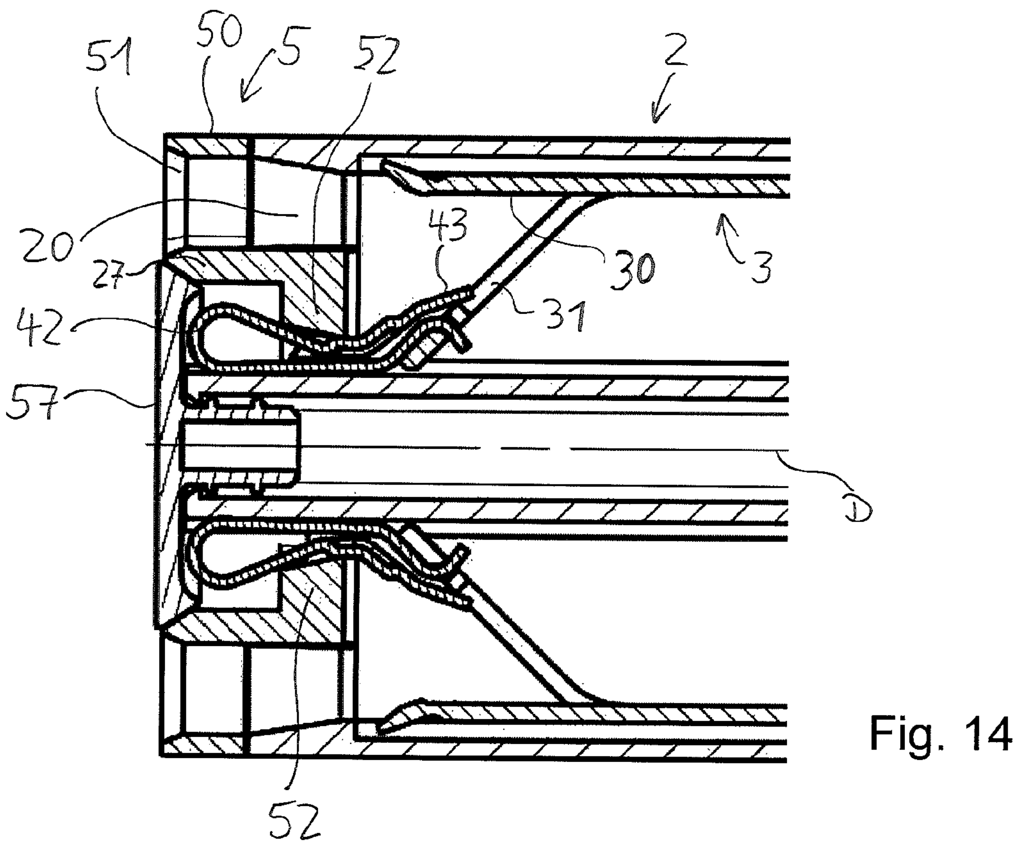
FIG. 14 shows the conductor connection terminal according to FIG. 12 in a longitudinal section.

FIG. 13 shows the conductor connection terminal in the longitudinal section in the actuation state of FIG. 11; FIG. 14 shows the conductor connection terminal in the longitudinal section in the actuation state of FIG. 12. The clamping springs 4 may be designed similarly as in the embodiment described above, in particular with a contact leg 41, a spring bow 42 and a clamping leg 43. There may in turn be a busbar piece 3 with a conductor clamping area 30 for clamping an electrical conductor and a retaining arm 31 to fix the contact leg 41. As can be seen, in FIG. 14 the clamping leg 43 is deflected radially inwards at the clamping spring 4 in the direction of the axis of rotation D by the deflection element 52 and accordingly moved from the busbar piece 3 located in the radial outer area within the first housing part 2. The clamping point is opened accordingly.

Figure 15:
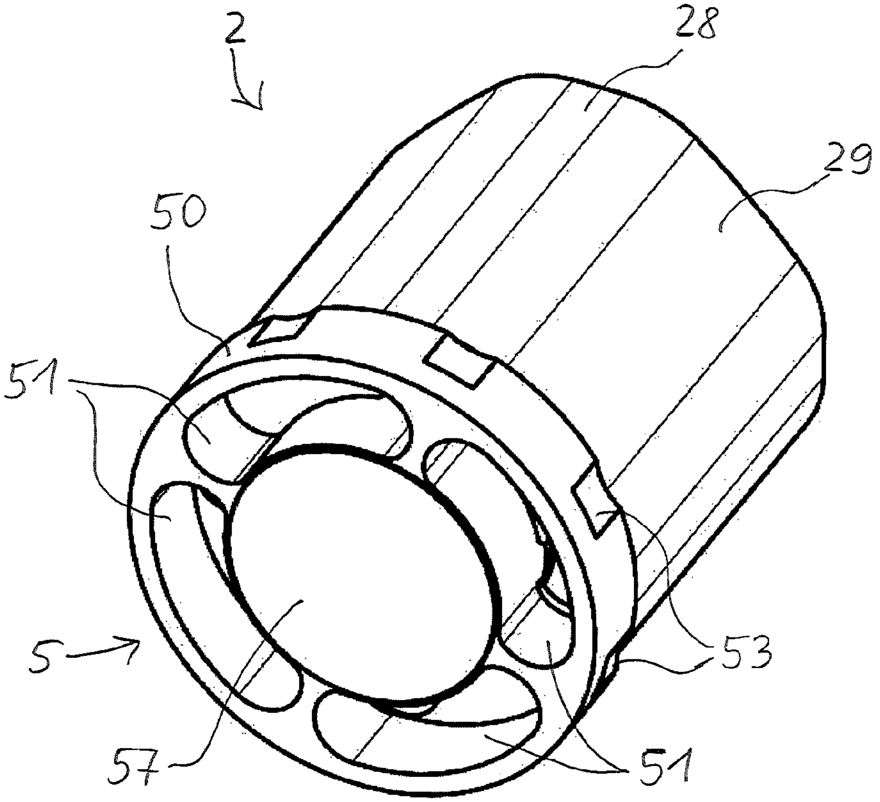
FIG. 15 shows a housing part with another rotary actuator in a perspective view.
Figure 16:
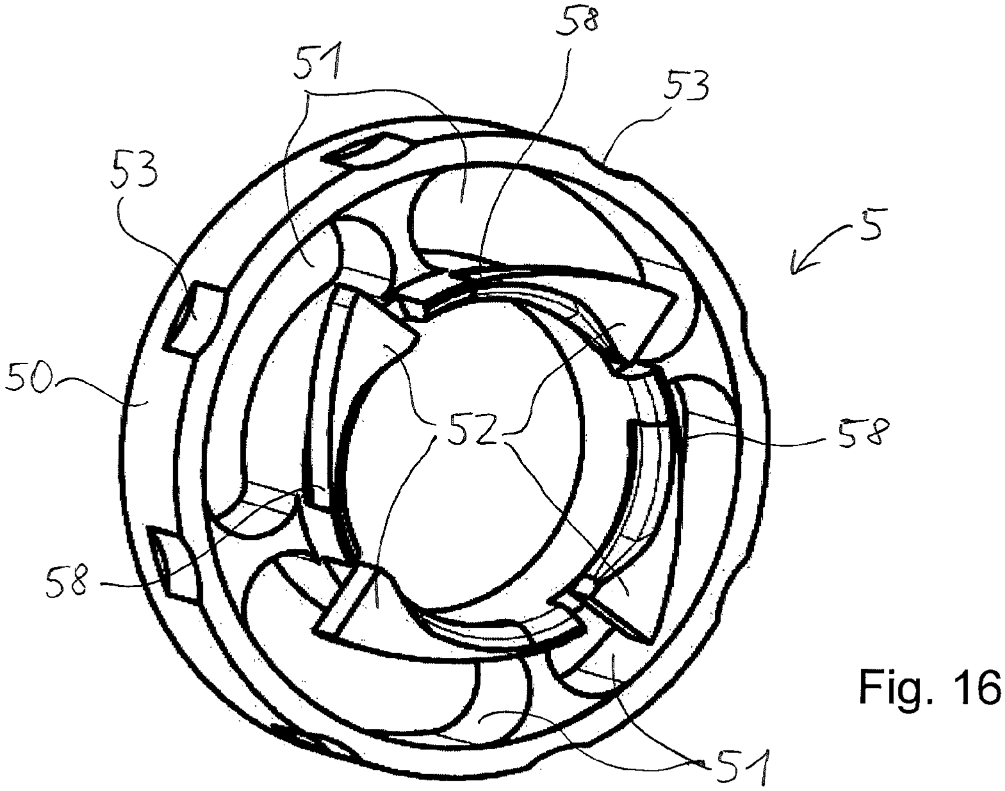
FIG. 16 shows the rotary actuator according to FIG. 15 in a perspective view.

FIGS. 15 and 16 show another embodiment of a rotary actuator 5, wherein FIG. 15 additionally shows the first housing part 2. The rotary actuator 5 according to FIGS. 15 and 16 is designed similar to the embodiment of FIGS. 9 and 10, in particular with the conductor openings 51. The grip enhancing members 53 present on the grip surface 50 of the rotary actuator 5 are in this case formed as recesses, but could also be designed as thickenings, similar to the embodiment of FIGS. 9 and 10. As FIG. 16 shows, the deflection elements 52 in this case are not rigidly arranged on the rotary actuator 5, as in the embodiment of FIGS. 9 and 10, but connected via elastic material bridges 58 to a basic body of the rotary actuator 5. In this way, the deflection elements 52 are coupled with the rotary actuator 5 in a flexible and radially deflectable manner.

Figure 17:
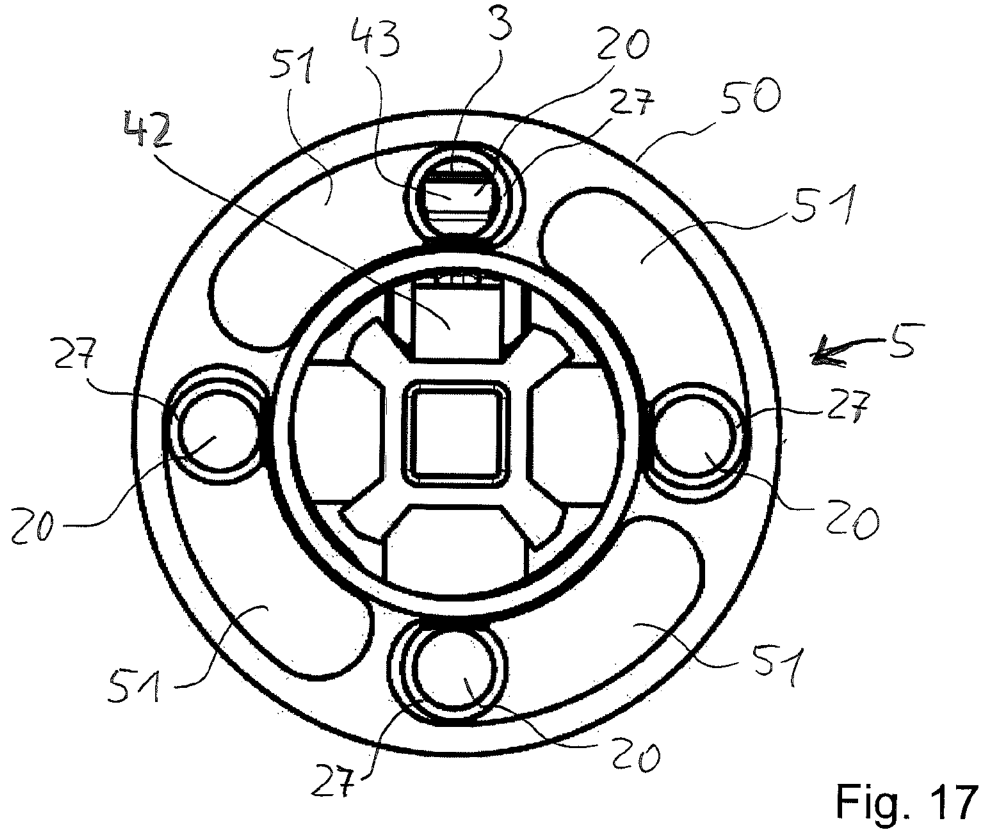
FIG. 17 shows a conductor connection terminal in top view on the conductor insertion side according to FIG. 15.
Figure 18:
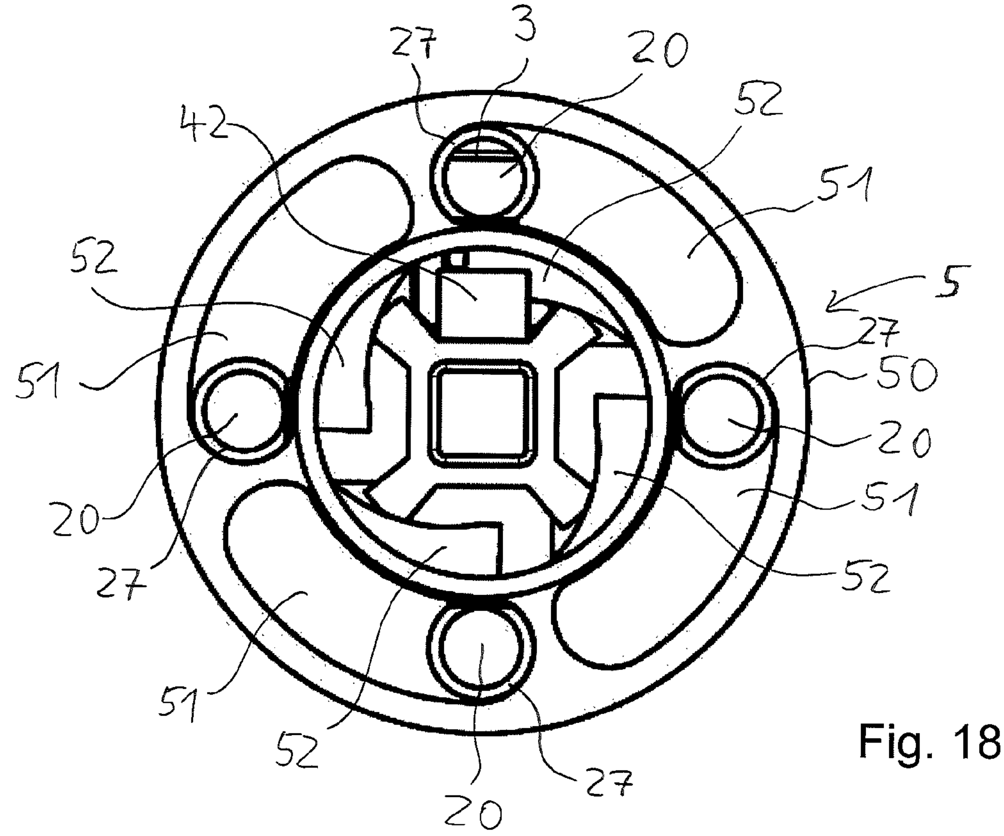
FIG. 18 shows the conductor connection terminal according to FIG. 17 in a different actuation state.

FIG. 17 shows a conductor connection terminal 1 with a rotary actuator 5, as previously described in FIGS. 15 and 16. Only the cover cap 57 is not shown. It can be seen that in the area of the respective conductor openings 51, the conductor insertion openings 20 are located. In FIG. 17, the clamping points are closed, i.e., the clamping springs 4 are not actuated by the deflection elements 52. In FIG. 18, the rotary actuator 5 is rotated by the first angle of rotation, so that the clamping springs 4 are deflected by the deflection elements 52 and the clamping points are open.

Figure 19:
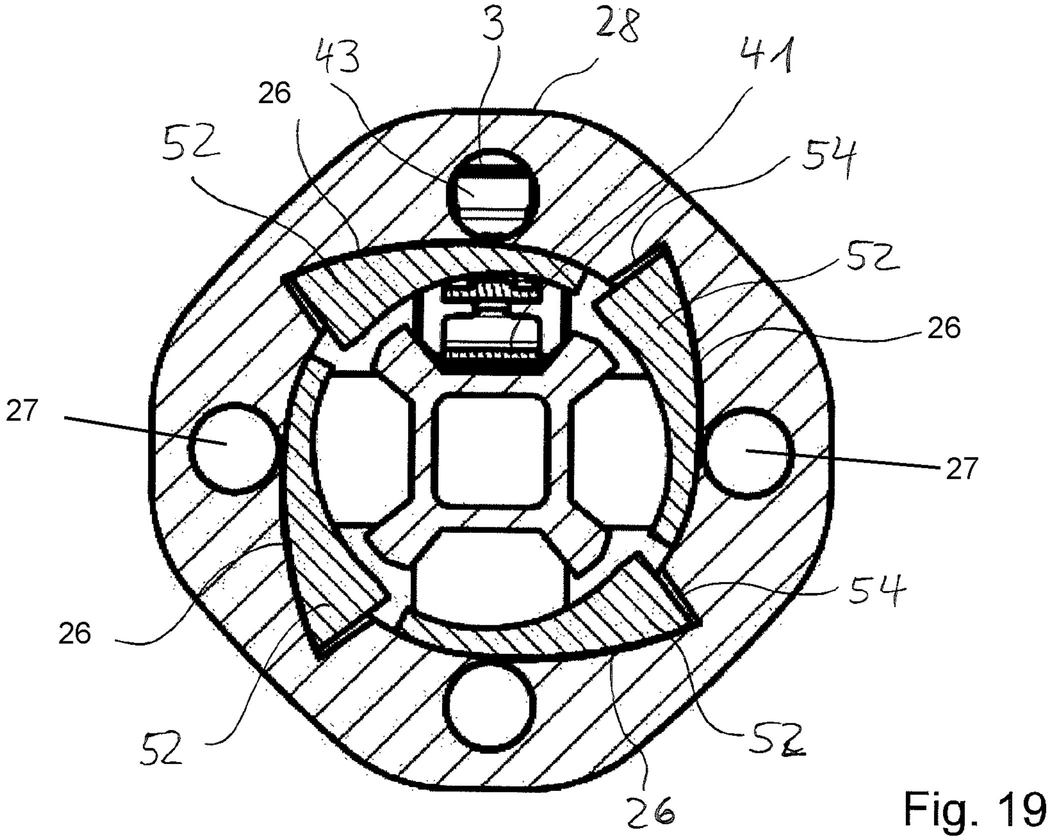
FIG. 19 shows the conductor connection terminal according to FIG. 17 in a cut view.
Figure 20:
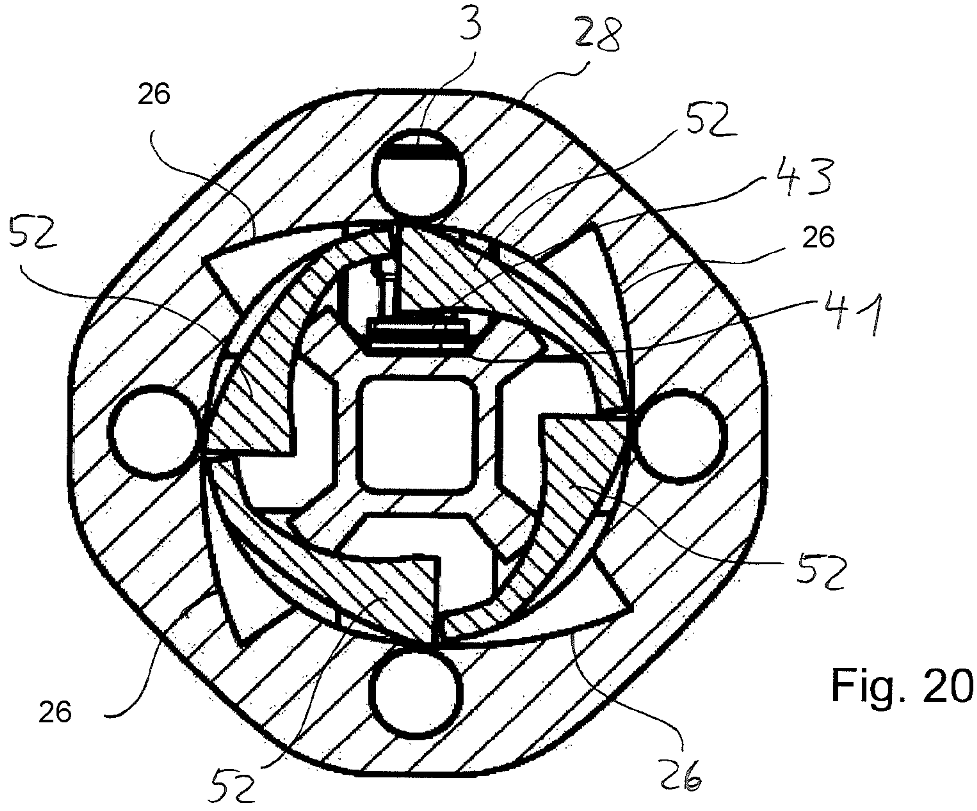
FIG. 20 shows the conductor connection terminal according to FIG. 19 in the other actuation state.

FIGS. 19 and 20 illustrate the more precise functioning of the deflection elements 52 in sectional representations in a respective cutting plane perpendicular to the axis of rotation D, which passes through the deflection elements 52. In the illustration of FIG. 19 the clamping points are closed; in the representation of FIG. 20 the clamping points are open, i.e., the rotary actuator 5 was rotated by the first angle of rotation as compared to the representation of FIG. 19.

It can be seen as an additional feature that an end stop 54 is formed on the first housing part 2, by which the rotational movement of the rotary actuator 5 is limited in one direction counterclockwise. The rotational movement can only be carried out until the respective deflection element 52 abuts the end stop 54 associated with it. It can also be seen that the deflection elements 52 can move along a deflection contour 26 of the first housing part 2 adapted to the shape of the deflection element and can support themselves against the force of the clamping spring 4. Accordingly, the support does not have to be done on conductor insertion channels.

Figure 21:
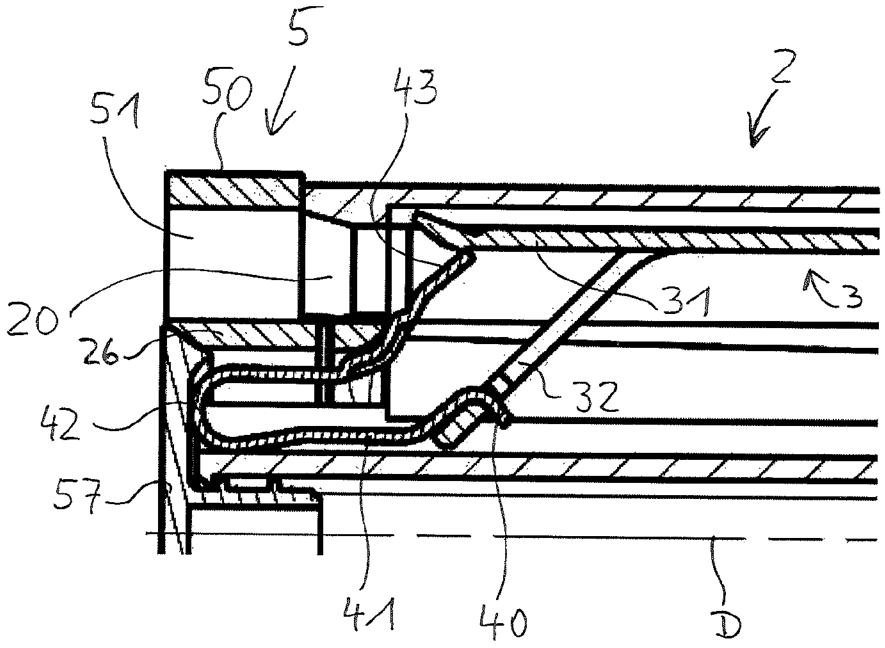
FIG. 21 shows a partial view of the conductor connection terminal according to FIG. 17 in the longitudinal section.
Figure 22:
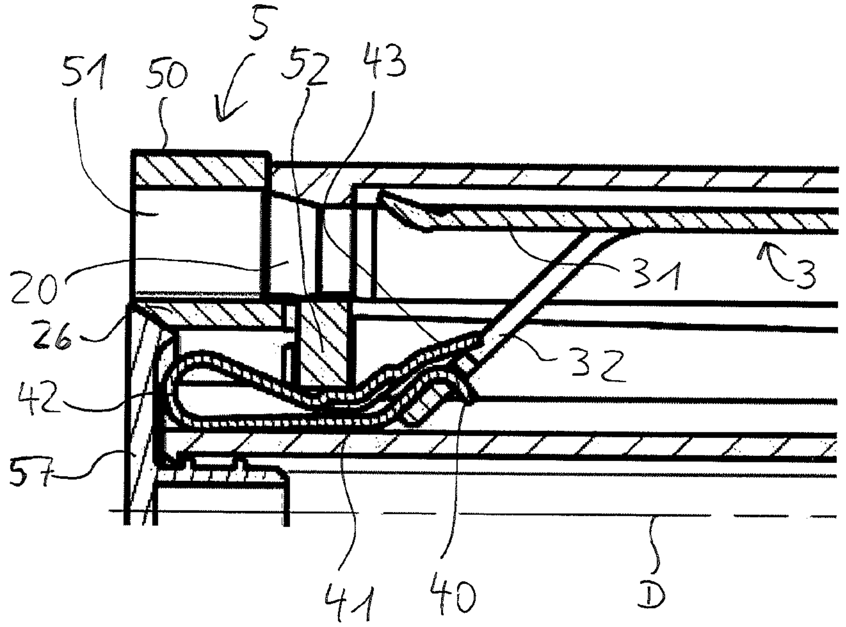
FIG. 22 shows a partial view of the conductor connection terminal according to FIG. 18 in the longitudinal section.

FIG. 21 shows the conductor connection terminal in the longitudinal section in the actuation state of FIG. 19, FIG. 22 shows the conductor connection terminal in the longitudinal section in the actuation state of FIG. 20. The clamping springs 4 may be designed similarly as in the embodiment described above, in particular with a contact leg 41, a spring bow 42 and a clamping leg 43. There may in turn be a busbar piece 3 with a conductor connection terminal area 30 for clamping an electrical conductor and a retaining arm 31 to fix the contact leg 41. As can be seen, in FIG. 22 the clamping leg 43 at the clamping spring 4 is deflected downwards by the deflection element 52 and accordingly moved away from the busbar piece 3. The clamping point is opened accordingly.

In the embodiment according to FIGS. 9 to 14 on the one hand and in the embodiment according to FIGS. 15 to 22 on the other hand, the spring force clamping connections with the clamping springs 4 and the busbars 3 are each arranged in a radial outer area of the connector 8 or the first housing part 2 and the clamping legs 41 of the clamping springs are deflected radially inwards in the direction of the axis of rotation D. Thus, the corresponding conductor insertion openings 20 are advantageously provided in a radial outer area.

In contrast, according to the embodiment of FIGS. 1 to 8, the conductor insertion openings 20 are arranged in a radial central area relatively close to the axis of rotation D and the clamping legs 41 of the clamping springs 4 are deflected by the deflection elements in a direction radially outwards away from the axis of rotation D.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conductor connection terminal comprising:

at least two spring force clamping connections, each having at least one clamping spring that forms a clamping point for clamping an electrical conductor with an associated busbar piece; and a rotary actuator that is a manual actuating element, the rotary actuator being rotatable about an axis of rotation and which, in the event of a rotation by a first rotation angle, is set up to deflect several or all of the clamping springs and thereby open the clamping points associated therewith, wherein the axis of rotation of the rotary actuator runs at least approximately parallel and/or in alignment with a conductor insertion direction of the several or all of the clamping springs to be actuated by the rotary actuator.

2. The conductor connection terminal according to claim 1, wherein the rotary actuator is rotatably mounted on a first housing part of the conductor connection terminal.

3. The conductor connection terminal according to claim 2, wherein the rotary actuator is a second housing part of the conductor connection terminal.

4. The conductor connection terminal according to claim 3, wherein the second housing part is formed as a cover part, which covers an interior of the first housing part at least partially.

5. The conductor connection terminal according to claim 1, wherein the several or all of the clamping springs to be actuated by the rotary actuator are arranged in a ring arrangement about a center and/or a center axis of the conductor connection terminal.

6. The conductor connection terminal according to claim 1, wherein the several or all of the clamping springs actuated by the rotary actuator in the rotation of the rotary actuator by the first rotation angle exert forces on the rotary actuator, which are in a force equilibrium.

7. The conductor connection terminal according to claim 1, wherein the rotary actuator has several deflection elements by which the respective clamping springs are deflected during the rotation of the rotary actuator by the first rotation angle.

8. The conductor connection terminal according to claim 7, wherein at least one of the deflection elements is flexibly coupled with the rotary actuator.

9. The conductor connection terminal according to claim 7, wherein the rotary actuator is rotatably mounted on a first housing part of the conductor connection terminal, and wherein the first housing part has a deflection contour for the deflection of at least one of the deflection elements.

10. The conductor connection terminal according to claim 1, wherein the rotary actuator is infinitely rotatable about the axis of rotation and/or in only one direction of rotation, or has an end stop to limit the rotational movement.

11. The conductor connection terminal according to claim 1, wherein an outer circumference of the rotary actuator has a grip surface on which the rotary actuator is to be operated manually, and wherein the grip surface extends over the entire outer circumference or one or more sections of the outer circumference.

12. The conductor connection terminal according to claim 1, wherein the rotary actuator is set up to deflect one or more clamping springs in an event of a rotation by a second rotation angle that is greater than the first rotation angle and thereby to open the associated clamping points which are not deflected when rotating by the first rotation angle.

13. The conductor connection terminal according to claim 1, wherein a conductor insertion side of the conductor connection terminal has conductor insertion openings through which electrical conductors can be led to the clamping points, wherein on a side facing away from the conductor insertion side, the conductor connection terminal has plug openings that lead to electrical plug contacts arranged in the housing of the conductor connection terminal.

14. The conductor connection terminal according to claim 1, wherein with the rotation of the rotary actuator by the first rotation angle, a total length of the conductor connection terminal does not change.

15. The conductor connection terminal according to claim 2, wherein, in the event of the rotation of the rotary actuator by the first rotation angle, an axial position of the rotary actuator does not change relative to the first housing part.

16. The conductor connection terminal according to claim 1, wherein the rotary actuator is set up to deflect the several or all of the clamping springs in the rotation by the first rotation angle which is less than 360 degrees or less than 180 degrees, and thereby to open the associated clamping points.

17. An electrical connector comprising at least one conductor connection terminal according to claim 1, wherein the electrical connector is a circular connector.

18. A conductor connection terminal comprising:

at least two spring force clamping connections, each having at least one clamping spring that forms a clamping point for clamping an electrical conductor with an associated busbar piece; and a rotary actuator that is a manual actuating element, the rotary actuator being rotatable about an axis of rotation and which, in the event of a rotation by a first rotation angle, is set up to deflect several or all of the clamping springs and thereby open the clamping points associated therewith, wherein the several or all of the clamping springs to be actuated by the rotary actuator are arranged in a ring arrangement about a center and/or a center axis of the conductor connection terminal, and wherein the axis of rotation of the rotary actuator runs through the ring-shaped arrangement of the clamping springs.

19. A conductor connection terminal comprising:

at least two spring force clamping connections, each having at least one clamping spring that forms a clamping point for clamping an electrical conductor with an associated busbar piece; and a rotary actuator that is a manual actuating element, the rotary actuator being rotatable about an axis of rotation and which, in the event of a rotation by a first rotation angle, is set up to deflect several or all of the clamping springs and thereby open the clamping points associated therewith, wherein for each of the several or all of the clamping springs to be actuated by the rotary actuator, the rotary actuator has a respective conductor opening for conducting an electrical conductor to the respective clamping point.

* * * * *